(12) United States Patent
Brunet

(10) Patent No.: US 7,748,860 B2
(45) Date of Patent: Jul. 6, 2010

(54) IDENTIFICATION DEVICE FOR VISUALLY IDENTIFYING CABLES OR DUCTS OVER THEIR ENTIRE LENGTH

(76) Inventor: Patrice Brunet, 37 Rue Gambetta, Fontaines sur Saone (FR) 69270

( * ) Notice: Subject to any disclaimer, the term of this patent is extended or adjusted under 35 U.S.C. 154(b) by 0 days.

(21) Appl. No.: 11/677,825

(22) Filed: Feb. 22, 2007

(65) Prior Publication Data

US 2008/0123323 A1    May 29, 2008

(30) Foreign Application Priority Data

Nov. 24, 2006   (FR)   ................... 06 10311

(51) Int. Cl.
*F21V 9/16* (2006.01)
*F21S 4/00* (2006.01)
*H01R 39/00* (2006.01)

(52) U.S. Cl. .................... 362/84; 362/391; 362/249.08; 362/249.14; 362/249.15; 362/253; 439/8

(58) Field of Classification Search ............. 362/84, 362/581, 391, 249.08, 249.14, 249.15, 806, 362/253

See application file for complete search history.

(56) References Cited

U.S. PATENT DOCUMENTS

| 6,742,909 | B2 * | 6/2004 | Conti et al. | 362/84 |
| 2005/0047120 | A1 * | 3/2005 | Sargent | 362/156 |
| 2005/0074223 | A1 * | 4/2005 | Moore | 385/147 |
| 2005/0184674 | A1 | 8/2005 | Kaler et al. | |

FOREIGN PATENT DOCUMENTS

WO   WO2006044177 A2   4/2006

OTHER PUBLICATIONS

PCT Search Report—PCT/FR2007/001920.

* cited by examiner

*Primary Examiner*—Sandra L O'Shea
*Assistant Examiner*—Sean P Gramling
(74) *Attorney, Agent, or Firm*—Cantor Colburn LLP

(57) ABSTRACT

The identification device comprises at least one electroluminescent wire that extends along the cable or duct to be identified. The electroluminescent wire is designed to be electrically supplied in a temporary manner, so as to display the path of the cable or duct. This device is applicable to the identification of electrical cables, or pneumatic and hydraulic ducts, or fibre-optic cables or cords.

15 Claims, 5 Drawing Sheets

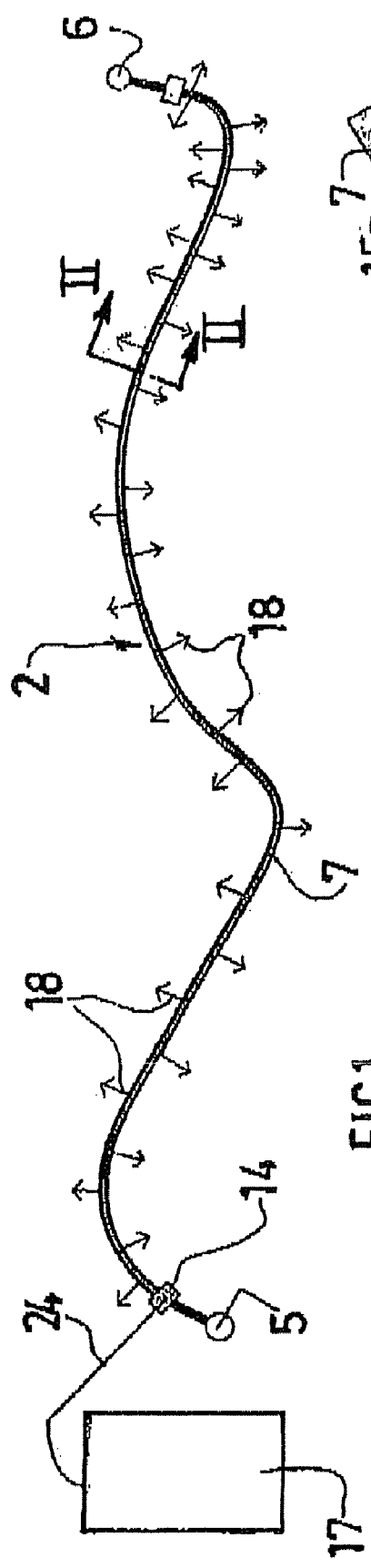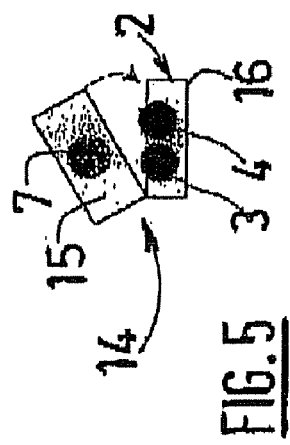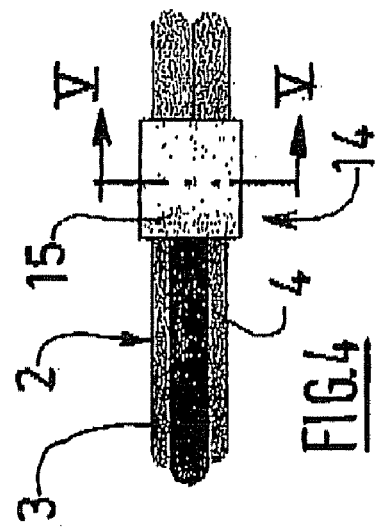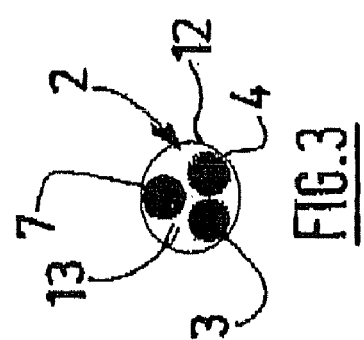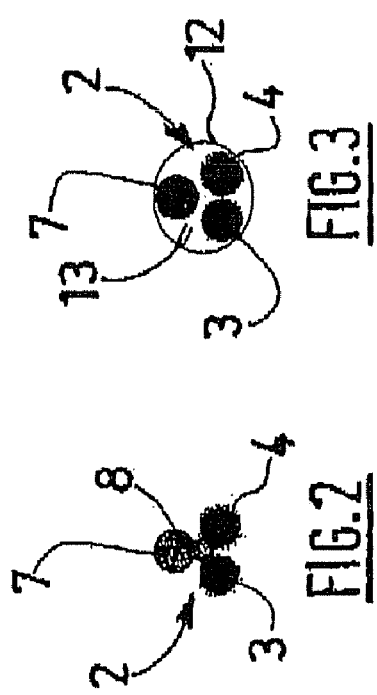

IDENTIFICATION DEVICE FOR VISUALLY IDENTIFYING CABLES OR DUCTS OVER THEIR ENTIRE LENGTH

TECHNICAL FIELD OF THE INVENTION

The disclosure relates to a device intended for visually identifying cables or ducts, this device having applications in the electrical field, data-processing field, etc. as regards cables, and also in the pneumatic and hydraulic fields as regards ducts. The term "cable" covers here electrical wires and cables of any length and of any size, conveying signals or transporting electrical energy, and also fibre-optic cables such as those referred to as optical "patch cords" (or "jumpers").

DESCRIPTION OF THE RELATED ART

In the various technical fields mentioned above, the problem that commonly arises is how to identify and/or trace cables or ducts, either to identify a cable or duct from an assembly comprising a relatively large number of cables or ducts or simply to determine the path of a single cable or duct. For example, it may be required to identify and trace a data-processing "patch" cord intermingled with numerous other similar cords in a cross-connection cabinet.

Various techniques aimed at identifying and tracing cables or ducts are known at the present time.

A first method consists quite simply in manually or visually following the continuous path of a cable or duct, with risks of human error due to the difficulty of tracing a cable or duct when it lies within a multitude of other cables or ducts of similar appearance. In addition, this method cannot be applied in the case of cables or ducts having portions that are manually or visually inaccessible, for example, cables or ducts passing through false floors or false ceilings.

Another known technique consists, with the aid of an electronic injector (when electrical cables are involved), in emitting an electrical signal that can propagate over the entire length of the cable and can in theory be detected at any point on this cable, for example using a sensor that emits an audible or visual signal. This technique does not allow precise identification of a cable when it lies within other contiguous cables. In addition, it is a technique that sometimes requires the normal operation of the cable to be interrupted and which in certain cases cannot be applied, for example for ducts made of an electrically non-conducting plastic, for example optical patch cords.

Another known category of identification systems consists of visual identification devices that use optical fibres whose path follows the cable or duct to be identified. However, owing to the power levels needed to illuminate optical fibres over their entire length, such a method is in practice limited to the illumination of one end of the fibre, when light is injected into its other end. Examples of this type of solution that may be mentioned here are European Patent 1 261 889 B1 and European Patent EP 0 686 267 B1.

A variant of the latter solution consists in incorporating, into cables or ducts, electrically conducting wires that terminate in light-emitting diodes or in other illumination means located at the ends of the cables or ducts—see U.S. Pat. Nos. 5,666,453, 6,577,243 and 6,975,242, or Patent Application US 2006/0057876.

More particularly, the aforementioned U.S. Pat. No. 5,666, 453 relates to a fibre-optic cable bearing discrete tell-tale devices in the form of light-emitting diodes (LEDs), which are placed in particular towards the ends of the cable near the terminal optical connectors and are located in all cases at particular points on the fibre-optic cable that are remote from one another. No notion of continuously illuminating the cable stems from this document.

These existing solutions allow the user to find the other end of a cable or duct quite easily when he already knows the approximate location of this other end and provided that the first end has already been clearly identified and is also accessible, in particular for being able to inject light into this first end.

However, the solutions considered here are not appropriate for tracing and identifying the entire path of a cable or duct since they only make it possible to identify one end of the cable or duct. Moreover, these solutions are unreliable, or even inapplicable, if the operator does not know where to look for the other end of the cable or duct. The latter situation is commonplace and it is therefore necessary to consider that one end of the cable or duct to be identified may, for example, be located inside a closed, cross-connection, plug-in unit, box or cabinet, beneath a false floor or in a false ceiling, etc., and hence invisible or inaccessible.

BRIEF SUMMARY OF THE INVENTION

The disclosure aims to remedy the abovementioned drawbacks, and thus an exemplary embodiment provides a device for identifying cables or ducts which, while still being of simple and inexpensive design, allows visual identification not only of the end but also the entire path of a cable or duct, even if another end of the cable or duct is not directly accessible, and to do so without requiring high power levels.

For this purpose, there is disclosed a visual identification device for visually identifying cables or ducts over their entire length, this device comprising at least one electroluminescent wire extending along the cable or duct to be identified, this electroluminescent wire being designed to be electrically supplied in a temporary manner, so as to display the path of said cable or duct.

The term "electroluminescent wire" is understood here to mean a wire, known per se, which includes a central electrical conductor or "core" covered with a phosphor-based layer having electroluminescent properties, this layer itself being surrounded by at least one other electrical conductor wound around said layer.

Thus, an exemplary embodiment of the disclosure adds adding one or more electroluminescent wires to a cable or duct, which wires extend over the entire length of the cable or duct, thereby allowing the operator to display, in a continuous manner, the path of the cable or duct thanks to the illumination of the electroluminescent wire(s), either from an accessible end or possibly from any point along the length of the cable or duct. One particular advantage of an exemplary embodiment of the device is the possibility of illumination over a very great length, possibly up to several hundred meters, using a single electroluminescent wire and from a single power supply point.

An exemplary embodiment of the visual identification device may comprise one or more electroluminescent wires incorporated during manufacture of the cable or duct, the electroluminescent wire(s) being either placed on the surface of the cable or duct, or embedded in the cable or duct but made visible in this case through a transparent or translucent sheath.

As a variant, the visual identification device according to the invention may be a device with one or more electroluminescent wires, said device being manufactured separately and added to the cable or duct, the device being applied and fastened to the surface of the cable or duct, for example, by bonding or via mechanical fastening.

In the case of the electroluminescent wire being fastened to the cable or duct by bonding, this may advantageously be accomplished by using a non-permanent flexible adhesive, allowing "repositionable" fastening and therefore allowing the identification device to be reused. The flexible adhesive, of the "mastic" kind, also allows the electroluminescent wire to follow the curvatures and deformations of the cable or duct, especially if said cable or duct is itself flexible. Advantageously, the identification device may be supplemented here with an accessory for installing the electroluminescent wire, i.e. for applying and fastening, by adhesive bonding, this electroluminescent wire to the cable or duct.

When the electroluminescent wire is mechanically fastened to the cable or duct, the fastening may be accomplished by ensuring that the cable or duct and the electroluminescent wire are encased in one and the same transparent or translucent sheath slit longitudinally or helically, in particular a flexible sheath in the case of a cable, the sheath preferably being removable. The use of a specific accessory can also be envisaged here, for installing such a sheath around the cable.

As they are currently available, the electroluminescent wires that can be used here may be cut to the suitable length without degrading their structure and their properties. They may thus be applied to any pre-existing configuration of cables or ducts. It is also conceivable to have two or more separate electroluminescent wires coming one after each other, over the length of a cable or duct, these wires being electrically connected together.

These electroluminescent wires also have, as a particular feature that can be advantageously exploited within the context of the disclosure, the ability to be electrically powered in an equivalent manner from any point along their length.

In particular, connection means for supplying power to the electroluminescent wire may be placed near each of the ends of the cable or duct. These connection means thus make it possible to inject the electric current at an already identified and accessible end of the cable or duct and to trace the cable or duct from this end over its entire length.

However, if the ends of the cable or duct are inaccessible or not initially identified, the connection means for supplying power to the electroluminescent wire may also be placed at an intermediate point along the length of the cable or duct, and the cable or duct may in this case be traced from any point along its length.

Advantageously, the connection means for supplying power to the electroluminescent wire are made in the form of a power connector fixed to said electroluminescent wire and surrounding the cable or duct, this power connector being designed to cooperate with a power injector formed from two opposed half-shells, which include internal electrical contacts, the two half-shells being able to be closed up so as to grip the cable or duct. Such an injector for supplying power to the electroluminescent wire may be brought in over the top of the cable or duct, without it being necessary to interrupt this cable or duct by cutting or disconnecting it. Advantageously, the power connector has a spherical general shape, while the power injector comprises two hemispherical half-shells, thereby facilitating its passage in cramped spaces, without the risk of catching.

Thus, the connection means for supplying power to the electroluminescent wire are themselves designed to be used in combination with an electrical power injector, which is designed to reach these connection means even in inaccessible recesses, in particular thanks to a relatively highly elongate pliers configuration, the two branches of the pliers bearing the two, especially hemispherical, half-shells respectively. One advantage of such power supply means is that they require no manual insertion operation and that they allow electric current to be fed in various directions whilst ensuring a reliable contact. As a complement to the arrangements needed for the electrical connection, the power injector advantageously includes an adaptable electronic unit designed to supply power to the electroluminescent wire according to the characteristics specific to this wire and/or the particular visual effects that are desired, for example flashing effects or particular illumination colours.

BRIEF DESCRIPTION OF THE DRAWINGS

The invention will be more clearly understood with the aid of the following description, with reference to the appended schematic drawing which shows, by way of examples, a few embodiments of this device for visually identifying a cable or duct:

FIG. 1 is a diagram showing the principle of a visual identification device for a cord or cable, according to the present invention;

FIG. 2 is a cross-sectional view of this device on II-II of FIG. 1, on an enlarged scale;

FIG. 3 is a sectional view similar to FIG. 2, illustrating a variant of the device;

FIG. 4 shows, on an enlarged scale, a detail of the device of FIG. 1 at a connector for supplying power to the electroluminescent wire;

FIG. 5 is a simplified cross-sectional view, on V-V of FIG. 4, passing through the power connector;

DETAILED DESCRIPTION OF THE INVENTION

Figure 6:
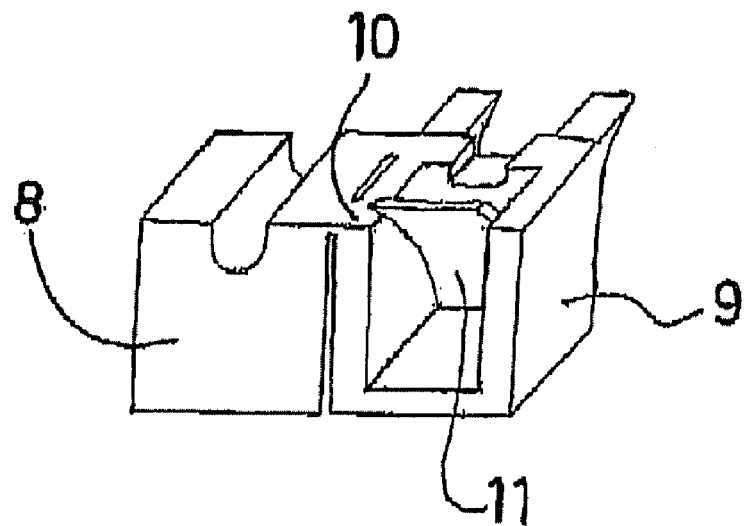
FIG. 6 is a perspective view, in the open state, of an accessory that can be used for installing the electroluminescent wire.

Referring firstly to FIGS. 1 to 5, the identification device is shown, as an example of its application, in combination with an optical patch cord, that is to say a cord denoted overall by the numerical reference 2, which joins two parallel optical fibres 3 and 4. The two ends of the cord 2 have optical connectors 5 and 6, that are known per se and not detailed here.

The identification device, associated with the cord 2, mainly comprises an electroluminescent wire 7 that extends along the cord 2, practically from one end of this cord 2 to the other, to which it is fastened by means that will be described below.

As regards the electroluminescent wire 7 itself, this is a product known per se, and especially one used hitherto for decorative purposes, which includes a central electrical conductor or "core" that is covered with a phosphor-based layer having electroluminescent properties. Said layer is itself surrounded by at least one other outer electrical conductor wound around the latter. As an example of such an electroluminescent wire the reader may refer here to Patent Documents WO 2004/064452 A1 and JP 7235376 A.

Figure 7:
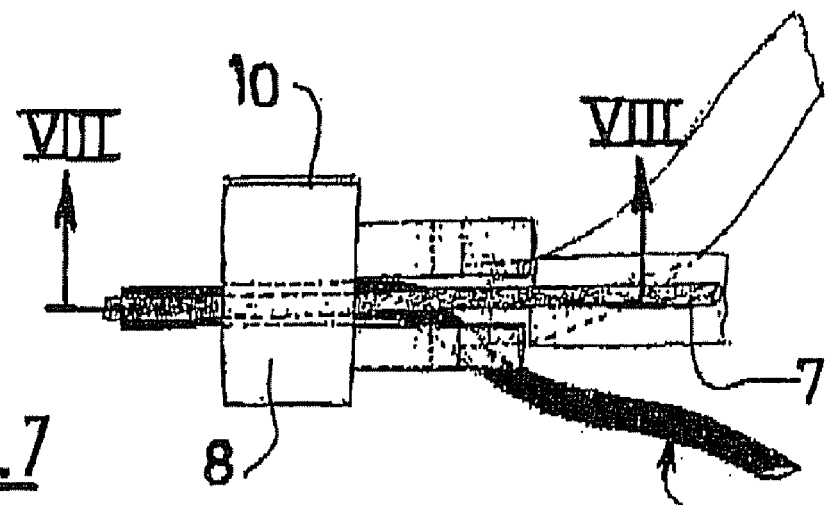
FIG. 7 is a plan view from above of the accessory of FIG. 6, during use.
Figure 8:
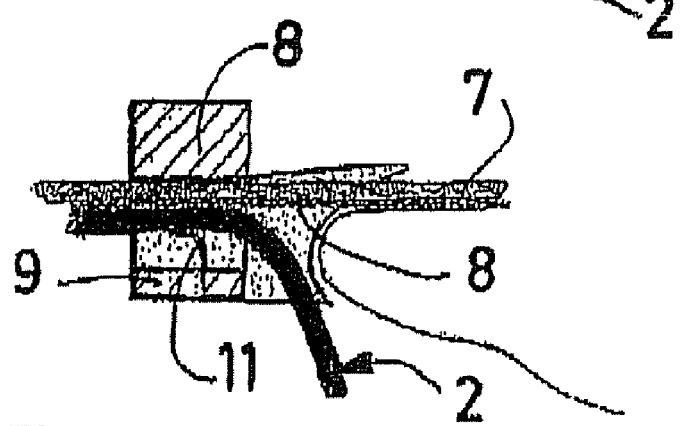
FIG. 8 is a sectional view of this accessory on VIII-VIII of FIG. 7.

For example, the electroluminescent wire 7 is fastened to the cord 2 by a strip of flexible adhesive 8, of the "mastic" kind, as illustrated schematically in FIG. 2, the electroluminescent wire 7 being attached to the optical fibres 3 and 4 of the cord. The electroluminescent wire 7 is thus fastened to the cord 2 so as to be able to be repositioned. To install the electroluminescent wire 7, that is to say to assemble it with the cord 2, it is advantageous to use a suitable accessory, shown in FIGS. 6 to 8, which consists of two parts 8 and 9 joined together by a flexible hinge 10 that allows them to be folded up, one with respect to the other, covering, on the one hand, the cord 2 and, on the other hand, the electroluminescent wire 7, the accessory exerting, at discrete points, pressure between these two elements so as to ensure that they are joined together. For this purpose, the accessory also advantageously includes at least one internal fin 11 of curved profile, which facilitates the removal of a non-stick film initially applied to the element formed by the electroluminescent wire 7 and by the strip of adhesive 8, and to do so without impeding the passage of the cord 2 through the accessory.

In a variant, shown in FIG. 3, the electroluminescent wire 7 is mechanically fastened to the cord 2 by means of a flexible translucent sheath 12, which includes a longitudinal strip 13. The sheath 12 here encases the cord 2 with its two optical fibres 3 and 4 and also the electroluminescent wire 7, so as to fasten them together over their entire length.

The particular arrangements provided at the two ends of the electroluminescent wire 7, and therefore near the terminal optical connectors 5 and 6 of the cord 2, for supplying power to the electroluminescent wire 7 will now be described with reference to FIGS. 4 and 5. In particular, as shown very schematically in FIG. 5, a power injector 14 is provided that is formed from two opposed half-shells 15 and 16 hinged to each other, which grip the cord 2 and the end of the electroluminescent wire 7. The power injector 14 is itself electrically connected to an electronic unit 17, which supplies power to the device at the desired voltage and the desired frequency, enabling the electroluminescent wire 7 to be illuminated over its entire length, as indicated symbolically by the arrows 18 in FIG. 1.

Figure 11:
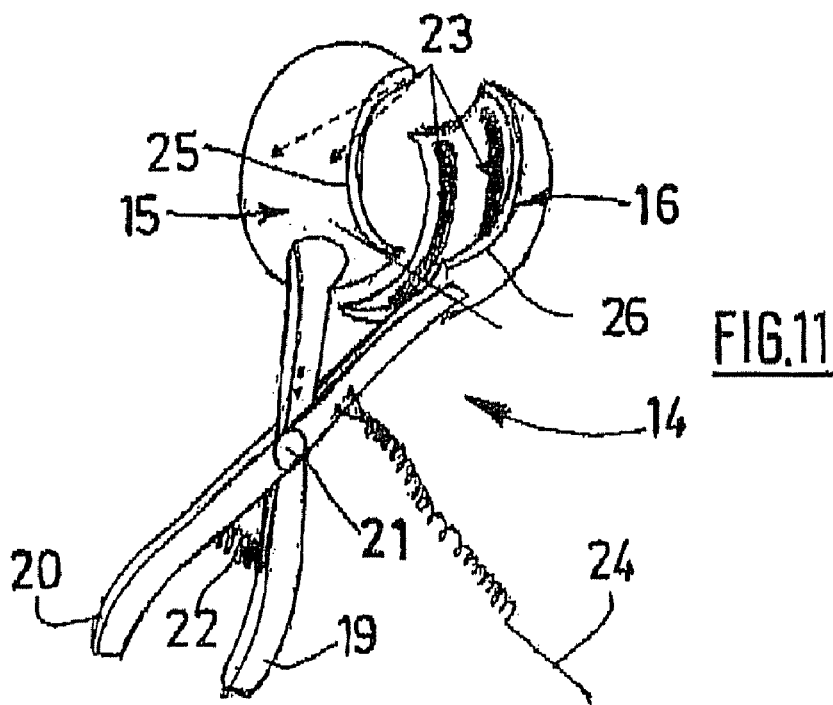
FIG. 11 is a perspective view of a power injector that can be used in combination with the connector of FIGS. 9 and 10.

In a preferred embodiment, shown in FIG. 11, the power injector 14 comprises two hemispherical half-shells 15 and 16 that are carried respectively by the two branches 19 and 20 of a pair of pliers, said branches being able to pivot one with respect to the other about a pin 21. A spring 22, mounted between the two branches 19 and 20, ensures that the latter, when the two half-shells 15 and 16 are in a closed-up position, can return. These half-shells include, on the inside, electrical contacts 23, electrically connected to power supply wires 24, which are themselves connected externally (not shown) to the abovementioned electronic unit. Finally, the two half-shells 15 and 16 have, on their edges, respective indentations 25 and 26 which come into correspondence when these two half-shells are brought together, so as to leave a passage for the cord 2 along a diametral direction.

Figure 9:
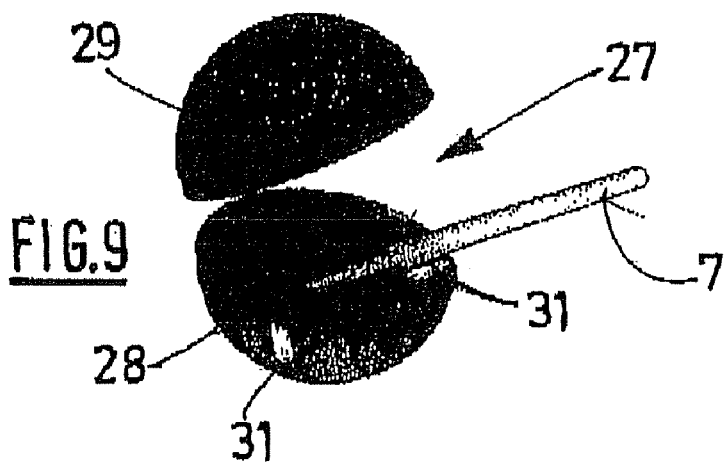
FIG. 9 shows a connector for supplying power to the electroluminescent wire.
Figure 10:
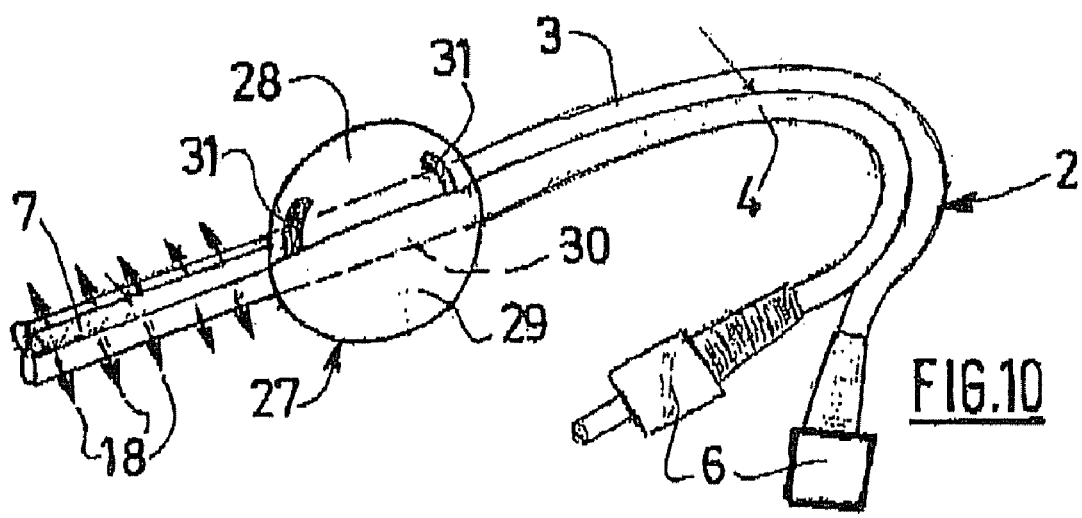
FIG. 10 shows the terminal part of a cord, provided with the connector according to FIG. 9.

The power injector 14 is designed to cooperate with a power connector 27 of complementary, and therefore spherical, external shape which is placed on the cord 2 close to one of the ends of the electroluminescent wire 7, as may be seen especially in FIGS. 9 and 10. The connector 27, itself formed from two hemispherical parts 28 and 29 folded up one against the other, includes a diametral internal channel 30 for passage of the cord 2. One of the hemispherical parts 28 carries two electrical contacts 31, each having an internal part, electrically connected to a conductor of the electroluminescent wire 7, and an external part.

Thus, when the power injector 14 is brought, via its two half-shells 15 and 16, around the power connector 27, the two half-shells 15 and 16 remain applied on this connector 27 by the effect of the closure of the spring 22, and the electrical contacts 23 of these half-shells 15 and 16 are then in correspondence with the external parts of the electrical contacts 31 of the connector 27, without any overlap and without any risk of a short-circuit owing to the arrangement adopted. It is thus possible to inject electric current into the electroluminescent wire 7, from one of its ends, and for this electroluminescent wire 7 therefore to be illuminated over its entire length. This enables it to be traced visually as far as its other end. Given that the path of the electroluminescent wire 7 is coincident with that of the cord 2, the illumination of the electroluminescent wire thus also allows the path of this cord 2 to be visually traced over its entire length.

Figure 12:
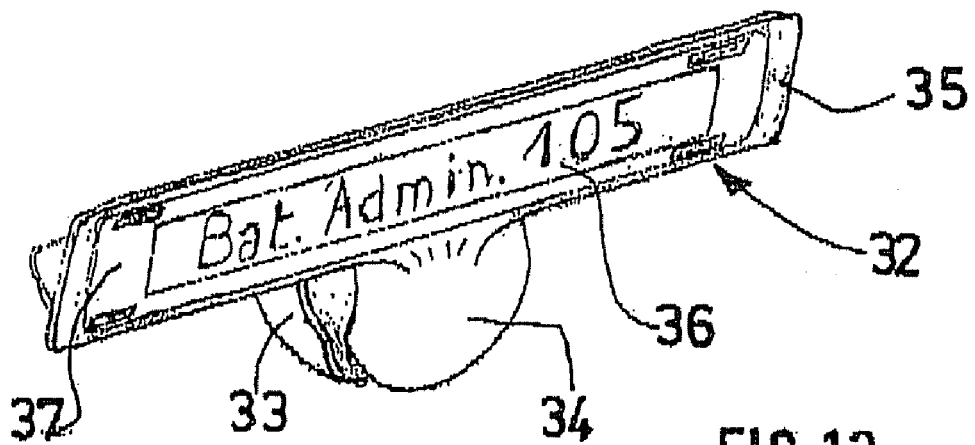
FIG. 12 is a perspective view of a label-carrying accessory that can be used in combination with the device of the invention.

The spherical shape of the power connector 27 may also be advantageously used, as illustrated in FIG. 12, for removably attaching a label-carrying accessory 32, which comprises two hemispherical parts 33 and 34 that form a retaining clamp on the connector 27, and an elongate plate 35 that can receive an identification label 36. The label 36 may be protected by a small removable transparent sheet 37. The label-carrying accessory 32 can be produced in various colours so as to be able to comply with a colour code defined by the user or else by the standards that apply in the field of use in question.

The spherical shape of the "clamp" parts 33, 34 of the label-carrying accessory 32 and its advantageous production from an electrically insulating material, such as a moulded plastic, also make it possible to electrically isolate the electrical contacts 31 of the connector 27 with respect to the environment and thus to ensure desirable electrical protection of these contacts 31.

Figure 13:
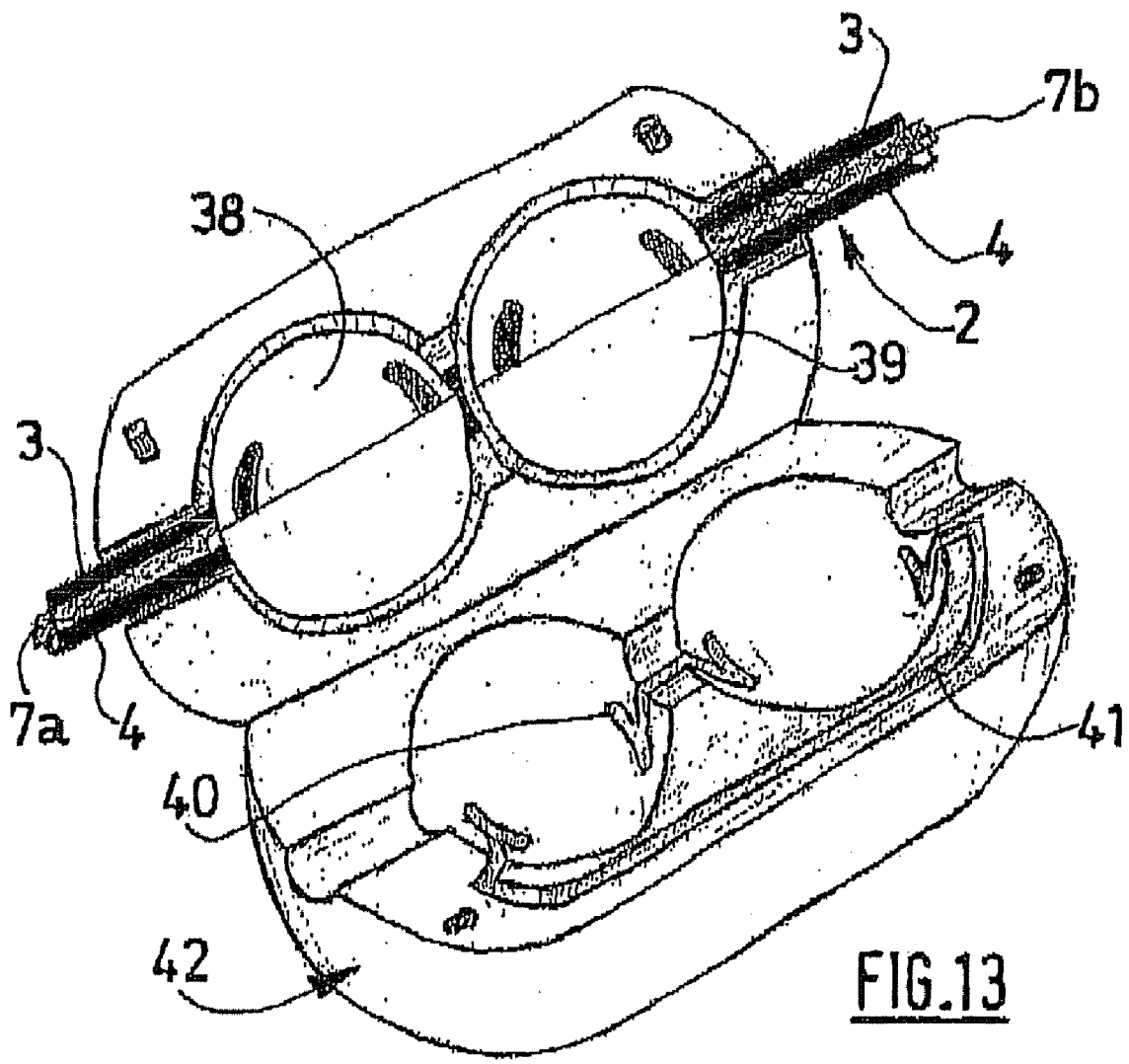
FIG. 13 is a perspective view showing a double connector that can be electrically connected to two electroluminescent wire portions.

Although the electroluminescent wire 7 has been described up to now as a single element, the length of which corresponds to the cord 2 with which it is associated, it should be noted that the device may also include two or more individual portions of electroluminescent wire that come one after another along the cord 2, or along a cable or a duct. In this case, it is necessary to connect together two successive portions of electroluminescent wire, which can be accomplished as illustrated in FIG. 13 by applying here, again, the principle of spherical connectors 38 and 39, which in the present case are brought together and receive, respectively, the ends of two electroluminescent wires 7a and 7b. The two connectors 38 and 39 are connected together via contacts and electrical links such as 40 and 41, belonging to a connection element 42 which covers these two connectors 38 and 39, enclosing them.

The visual identification device described above is especially applicable for identifying fibre-optic cords 2 or "patch" cords in a cross-connection cabinet. Beyond this main function of individually identifying a cord, the two electrical conductors of the electroluminescent wire 7 could advantageously be used for transmitting information about the state of correspondence between the ends of the cord, cable or duct, for example, with an electronic device as described in International Patent Application WO 2005/032162 A1.

In addition, the electroluminescent wire 7 could be supplied, and therefore illuminated temporarily, when operations for modifying the reconnection arrangements are programmed by an electronic device. This means that the operator's action can be carried out more easily and safely. For this purpose, the electrical conductors of the electroluminescent wire 7 may, for example, be supplied via a spherical connector corresponding to one half of FIG. 13, previously commented upon, the electrical connections being produced with the fixed connection part.

Figure 14:
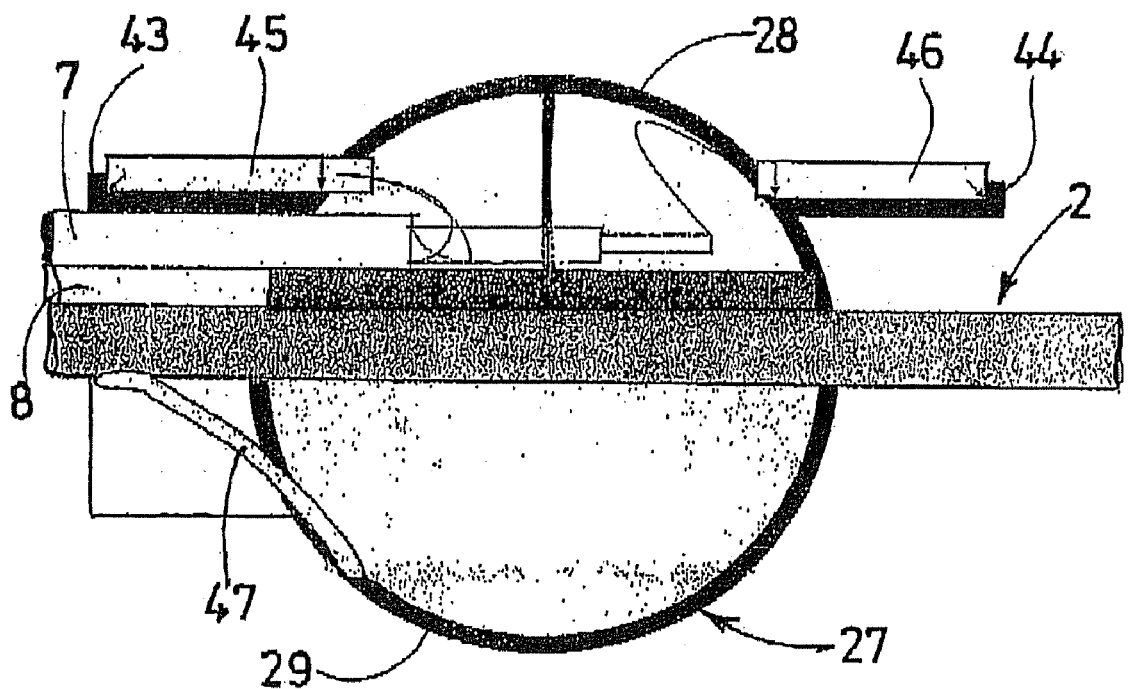
FIG. 14 is a schematic sectional view of a variant of a connector for supplying power to the electroluminescent wire.

FIG. 14 shows a variant of the connector 27 for supplying power to the electroluminescent wire 7. The connector 27 is, here again, made with a spherical shape, by two hemispherical parts 28 and 29 being joined together, and is traversed diametrically by the cord 2. Two opposed cylindrical parts 43 and 44, coaxial with each other and with the cord 2, extend the spherical part of this connector 27 towards the outside, and two contacts 45 and 46 are positioned on the cylindrical parts 43 and 44 respectively, these contacts 45 and 46 being connected in one case to the inner conductor and in the other case to the outer conductors of the electroluminescent wire 7. A flexible blade 47 allows the connector 27 to be fitted to cords 2 of various sizes.

Figure 15:
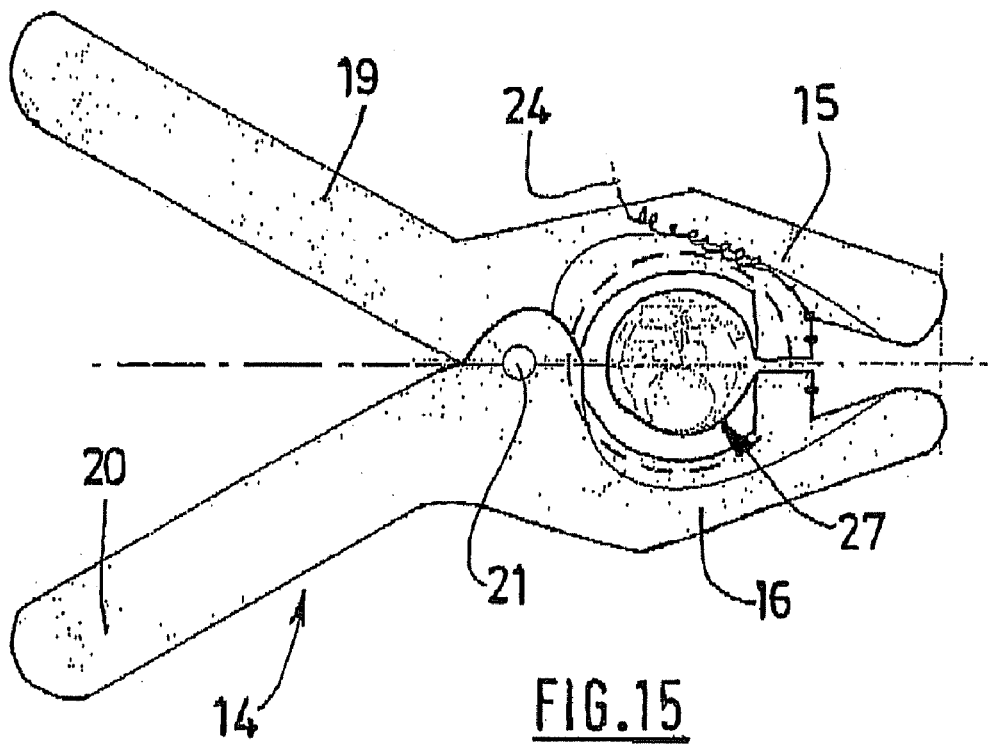
FIG. 15 shows the power injector that can be used in combination with the connector of FIG. 14.

Finally, FIG. 15 shows a power injector 14, here configured in the form of pliers, which is especially adapted for the connector 27 according to FIG. 14, this power injector 14 being designed to clamp on to the spherical part of the connector 27 and to cooperate with the two contacts 45 and 46 of the latter.

It would not be outside the scope of the invention, as defined in the appended claims, to:
  use other means, for example connectors of different configuration, for supplying power to the electroluminescent wire;
  add any accessory to the device that facilitates its use or its installation; and
  to apply this device for identifying cords, wires, cables and the like of any kind, or to identify ducts or pipes conveying fluids.

The invention claimed is:

1. A visual identification device for visually identifying cables over their entire length, the visual identification device comprising:
  at least one electroluminescent wire extending along an exterior surface of the cable to be identified, the at least one electroluminescent wire being configured to display a path of said cable,
  a connection means for supplying power to the electroluminescent wire, said connection means being a power connector fixed to said at least one electroluminescent wire and surrounding the cable or duct;
  power injector formed from two opposed half-shells, which include internal electrical contacts, the two half-shells being configured to be closed up so as to grip the power connector and the cable or duct surrounded by the power connector,
  wherein the power connector has a spherical general shape, while the power injector comprises two hemispherical half-shells.

2. The visual identification device according to claim 1, wherein said at least one electroluminescent wire is incorporated during manufacture of the cable, said at least one electroluminescent wire being either placed on a surface of the cable or duct, or embedded in the cable or duct but made visible via a transparent or translucent sheath.

3. Visual identification device according to claim 1, wherein said device with said at least one electroluminescent wire is manufactured separately and added to the cable, the device being applied and fastened to a surface of the cable or duct.

4. Visual identification device according to claim 3, wherein the a least one electroluminescent wire is fastened to the cable by bonding using a non-permanent flexible adhesive, allowing "repositionable" fastening.

5. Visual identification device according to claim 4, further including an accessory for installing the at least one electroluminescent wire by adhesive bonding the at least one electroluminescent wire to the cable.

6. Visual identification device according to claim 3, wherein the device is applied and fastened to the surface of the cable or duct via mechanical fastening of the electroluminescent wire to the cable or duct, the cable and the electroluminescent wire are encased in one and a same transparent or translucent sheath slit longitudinally or helically.

7. Visual identification device according to claim 1, wherein the power connector has two coaxial opposed cylindrical parts, which extend a spherical part of this connector towards an outside and on which two contacts are respectively positioned.

8. Visual identification device according to claim 1, wherein the power injector has a pliers configuration including two branches, said two branches of the pliers bearing the two, especially hemispherical, half-shells respectively.

9. Visual identification device according to claim 1, wherein the connection means for supplying power to the at least one electroluminescent wire are designed to be used in combination with the power injector which, as a complement to the arrangements needed for the electrical connection, includes an adaptable electronic unit designed to supply power to the at least one electroluminescent wire according to characteristics specific to a particular electroluminescent wire and/or particular visual effects that are desired.

10. Visual identification device according to claim 1, further including a label-holder accessory, comprising two hemispherical parts that form a retaining clamp on the power connector, the label-carrying accessory being advantageously made of an electrically insulating material.

11. Visual identification device according to claim 1, wherein the device is configured to identify fibre-optic cables or "patch cords".

12. Visual identification device according to claim 6, wherein said sheath is a flexible and removeable sheath in the case of the cable.

13. Visual identification device according to claim 1, wherein said connection means is placed near each of the ends of the cable.

14. Visual identification device according to claim 1, wherein said connection means is placed at an intermediate point along the length of the cable.

15. Visual identification device according to claim 9, wherein said particular visual effects are at least one of flashing effects or particular illumination colors.

* * * * *